United States Patent [19]

Treadwell et al.

[11] 4,032,468
[45] June 28, 1977

[54] HYDROLYTICALLY STABLE URETHANE FOAM PRECURSORS

[75] Inventors: Kenneth Treadwell, Rahway; Melvin H. Gitlitz, Edison, both of N.J.

[73] Assignee: M & T Chemicals Inc., Greenwich, Conn.

[22] Filed: Sept. 13, 1976

[21] Appl. No.: 722,523

Related U.S. Application Data

[63] Continuation-in-part of Ser. No. 534,490, Dec. 19, 1974, abandoned.

[52] U.S. Cl. .................. 252/182; 260/2.5 AB; 260/2.5 AC
[51] Int. Cl.$^2$ ............. C08G 18/18; C08G 18/20; C08G 18/24; C08G 18/32
[58] Field of Search ............ 252/182; 260/2.5 AB, 260/2.5 AC, 77.5 AB, 77.5 AC, 77.5 AQ

[56] References Cited

UNITED STATES PATENTS

| | | | |
|---|---|---|---|
| 3,044,971 | 7/1962 | Polis | 260/2.5 AB |
| 3,194,773 | 7/1965 | Hostettler | 260/2.5 AB |
| 3,378,497 | 4/1968 | Lanham | 252/182 |
| 3,392,153 | 7/1968 | Hostettler et al. | 260/2.5 AB |
| 3,507,815 | 4/1970 | Bailey et al. | 252/182 |
| 3,620,985 | 11/1971 | Larkin et al. | 260/2.5 AC |
| 3,669,913 | 6/1972 | Morehouse | 252/182 |
| 3,736,272 | 5/1973 | Mosso et al. | 252/182 |
| 3,822,223 | 7/1974 | Gemeinhardt et al. | 260/2.5 AC |
| 3,833,526 | 9/1974 | Cear et al. | 260/2.5 AC |
| 3,876,567 | 4/1975 | Larkin et al. | 260/2.5 AB |

Primary Examiner—Richrd E. Schafer
Assistant Examiner—T. S. Gron
Attorney, Agent, or Firm—Robert P. Auber; Kenneth G. Wheeless; Robert Spector

[57] ABSTRACT

The hydrolytic stability of catalyst-containing precursors for both flexible and rigid polyurethane foams wherein the catalyst is a tin compound is considerably increased when the catalyst is a triorganotin compound wherein the hydrocarbon groups bonded to the tin atom are methyl or methoxymethyl.

3 Claims, No Drawings

HYDROLYTICALLY STABLE URETHANE FOAM PRECURSORS

This application is a continuation-in-part of application Ser. No. 534,490, filed Dec. 19, 1974, now abandoned.

BACKGROUND

This invention relates to the preparation of cellular polyurethanes. This invention further relates to hydrolytically stable precursors for the preparation of rigid and flexible cellular polyurethanes. The precursors contain a class of organotin gel catalysts that are water soluble and hydrolytically stable.

It is well known to prepare cellular polyurethanes by reacting polyfunctional isocyanates with polyalkylene polyols in the presence of water as the foaming or blowing agent. The water reacts with some of the isocyanate present to generate bubbles of carbon dioxide that are entrapped as the remainder of the isocyanate copolymerizes with the polyol to form the polyurethane. A silicone type of surfactant is often included to obtain a uniform structure of small cells within the foam. Both a gel catalyst and a blowing catalyst are usually required to obtain the proper balance between the rates of the polymerization and foaming reactions required to obtain a commercially acceptable product.

Cellular polyurethanes are often prepared using a precursor or master batch containing all of the ingredients, other than the polyfunctional isocyanate, required to prepare the polymer. Such a precursor is conventionally made up in large quantities and used as required. In addition to simplifying preparation of the polyurethane, employing a master batch improves product uniformity, since it ensures that all of the reagents except the isocyanate are present in identical proportions in all foams having the same formulation.

Organic and inorganic tin compounds are preferred gel catalysts for cellular polyurethanes. Many of these tin compounds decompose relatively rapidly in the presence of water, which may contain a tertiary amine co-catalyst, to yield stannous or stannic oxide. These tin compounds therefore cannot be employed in any precursor or master batch containing significant amounts of water and tertiary amine.

An objective of this invention is to provide hydrolytically stable tin-containing precursors for cellular polyurethanes.

Unexpectedly it has now been found that certain methyltin compounds and methoxymethyltin compounds are unique among tin-containing catalysts in that they are both soluble in and not significantly affected by water, and can therefore be incorporated into precursors for cellular polyurethanes that contain water as a blowing agent.

SUMMARY OF THE INVENTION

This invention provides hydrolytically stable catalyst-containing precursors for cellular polyurethanes, said precursors comprising 100 parts by weight of a polyol, between 0.5 and 5 parts of water, between 0.05 and 0.5 parts of a foaming catalyst, between 0.5 and 2 parts of a silicone surfactant, and between 0.05 and 0.5 parts of a gel catalyst, said gel catalyst being an organotin compound of the formula $R_aSnX_{4-a}$, $R_2SnO$ or $(R_3Sn)_2O$ wherein R is $CH_3-$ or $CH_3OCH_2-$, $a$ is the integer 2 or 3 and X represents a chlorine, bromine or iodine atom or the radical $-OOCCH_3$ or $-OOCCH_2CH_3$.

DETAILED DESCRIPTION OF THE INVENTION

The hydrolytically stable precursors of this invention contain as the gel catalyst at least one methyltin or methoxymethyltin halide (chlorides, bromides and iodides), oxide or derivative of either acetic or propionic acid. The compounds contain 2 or 3 methyl or methoxymethyl radicals bonded to the tin atom, and are of the formula $R_aSnX_{4-a}$, $R_2SnO$ or $(R_3Sn)_2O$ wherein R, $a$ and X are as previously defined. Depending upon conditions, the oxides may exist as the corresponding hydroxides. This equilibrium is well known in the art.

The concentration of the present gel catalysts in polyurethane formulations is similar to that of other organotin compounds conventionally employed as gel catalysts. Between 0.05 and 0.5 parts of catalyst per 100 parts by weight of polyol is usually effective. Slightly larger or smaller amounts may be required to provide optimum performance in specific formulations.

Cellular polyurethanes are prepared by reacting a polyol with a polyfunctional organic isocyanate in the presence of a polymerization or gel catalyst and a foaming agent. Preferably a silicone type surfactant and a foaming catalyst are also present to obtain the desired cell structure within the foam. Suitable foaming catalysts include both linear and heterocyclic amines and specified mixtures of antimony carboxylates with salts of nitrogen containing compounds as disclosed in U.S. Pat. No. 3,620,985.

Any available organic polyfunctional isocyanate can be used to prepare cellular polyurethanes in accordance with the present method. The criteria that govern selection of a particular isocyanate are sufficiently well known to one skilled in the art that a detailed discussion of the subject is not required in this specification. One of the most widely employed polyisocyanates is a commercially available type of mixed tolylene diisocyanates containing about 80% by weight of 2,4-tolylene diisocyanate and 20% of the 2,6-isomer. Representative members from other classes of suitable polyisocyanates include, but are not limited to methylene-bis-(4-phenyl isocyanate), 3,3'-dimethoxy-4,4'-biphenylene diisocyanate, naphthalene-1,5-diisocyanate, hexamethylene diisocyanate, 1,4-phenylene diisocyanate and polyphenylene polymethylene diisocyanate. For a flexible foam, the concentration of polyisocyanate in the polyurethane reaction mixture should be equivalent to between 1 and 7 isocyanate groups for each active hydrogen (as determined by the Zerewitinoff method) present in the polyol component.

The polyalkylene polyol component of the polyurethane reaction mixture typically exhibits a molecular weight greater than 200. The molecule may contain one or more ester, esther, amide, thio($-S-$) or amino radicals. Preferred types of polyols include hydroxyl terminated polyethers and polyesters, and may contain one or more pendant hydroxyl groups on the polymer chain. Dibasic carboxylic acids suitable for preparing hydroxyl terminated polyesters include aromatic and aliphatic acids such as adipic, fumaric, sebacic and the isomeric phthalic acids. The acids are reacted with a glycol or polyol such as ethylene glycol, diethylene glycol, propylene glycol or trimethyol propane. If the polyol component contains 3 or more hydroxyl groups, the stoichiometry should be such as to avoid formation of highly cross-linked products.

Polyether polyols are derived from a controlled polymerization of olefin oxides, and include polyethylene glycols, polypropylene glycols and copolymers of ethylene oxide and propylene oxide wherein the molecular weight of the polymer is at least 200. Most desirably these polyols are liquids exhibiting a molecular weight of between 500 and 5,000. Frequently an olefin oxide such as propylene oxide is reacted with a linear diol or triol such as glycerine to form the final polyol, which is subsequently reacted with a polyfunctional isocyanate to obtain the polyurethane.

The reaction of a stoichiometric excess of diisocyanate with a polyol produces a modified polyether having terminal isocyanate groups. When it is desired to form a cellular polyurethane, the isocyanate-modified polyether reacts through the isocyanate groups with a chain-extending agent containing active hydrogen, such as water. This involves several different reactions that proceed simultneously, including a reaction between the isocyanate groups and water to form urylene links (—NHCOHN—) and carbon dioxide. The resultant urylene links will react further with free isocyanate groups to form biuret cross links. Depending upon the desired density and degree of crosslinking, the relative concentrations of isocyanate and active hydrogen (including both water and polyol) should be such as to provide a ratio of 0.8 to 1.2 equivalents isocyanate per equivalent of active hydrogen, and preferably a ratio of 0.9 to 1.1.

The amount of water present in the polyurethane reaction mixture should be sufficient to produce the required amount of carbon dioxide for a foam of the desired density. As previously disclosed, carbon dioxide is generated by the reaction of water with some of the polyfunctional isocyanate.

Auxiliary foaming or blowing agents, such as liquid fluorocarbons that boil between 30° and 60° C. can be included in the formulation, together with a blowing catalyst, which is believed to catalyze the reaction between the water and polyisocyante, thereby ensuring a proper balance between the rates of polymer formation and gas evolution.

Cellular polyurethanes are often prepared using the one-shot method whereby controlled amounts of all reagents, catalysts and a cell modifier are continuously fed into a suitable mixing device such as a mixing head. The resultant foam is removed as it is formed by conveyor or other suitable transport means. While this technique is suitable for large scale production of a given type of polyurethane foam, for smaller quantities it may be desirable to employ a batch processing using a precursor or master batch containing all components except the polyisocyanate. The batch process is particularly desirable when different types of foams are to be prepared using the same polymerization vessel. It is in this application that the present hydrolytically stable organotin compounds are markedly superior to other organotin compounds conventionally employed as gel catalysts. Precursors containing water and the present methyltin or methoxymethyltin compounds can be stored for extended periods of time with substantially no loss in catalyst activity.

In addition to being hydrolytically stable, the present gel catalysts are soluble in water. This solubility is advantageous, since the tin compounds are present in relatively small amounts (0.05 to 0.5 parts per 100 parts by weight of polyol) in the polyurethane formulation. By dissolving the tin compound in a large amount of water and adding an aliquot of the resulting solution to a given formulation, it is possible to exercise greater control over catalyst concentration in the formulation, thereby improving uniformity between successive batches of foam.

The prior art relating to so-called one-shot methods for preparing polyurethane foams teaches that the organotin type of gel catalyst should usually be added to the reaction mixture as a separate component because the catalyst is usually insoluble in the other components of the formulation. Since the amount of catalyst added is relatively small compared to the amount of polyol, effective process control may be difficult to achieve. By comparison, an aqueous solution containing one of the present hydrolytically stable catalysts can be prepared and stored until needed with no significant loss in catalyst activity.

Stannous compounds such as stannous octoate are often preferred over tetravalent organotin compounds in flexible foam formulations because the organotin compounds, as a rule, do not yield a foam exhibiting good heat stability.

Dibutyltin derivatives of carboxylic acids, such as dibutyltin dilaurate, are conventionally employed as gel catalysts in rigid polyurethane foam formulations, however these catalysts exhibit poor hydrolytic stability, and therefore cannot be in contact with water until just prior to additon of both the polyol and isocyanate.

In addition to being hydrolytically stable, the present organotin gel catalysts do not adversely affect the heat stability of the final foam, and are therefore useful for preparing both flexible and rigid foams that meet the severe criteria required for a commercial scale process. The catalysts of this invention are therefore more versatile than either the stannous or tetravalent organotin compounds formerly employed as gel catalysts.

The following examples illustrate preferred embodiments of the present invention and should not be interpreted as limiting the scope thereof except as defined in the accompanying claims.

EXAMPLE 1

Bis(methoxymethyl)tin dichloride was prepared by heating a mixture containing powdered tin metal (120 g.) and chloromethyl methyl ether (300 cc.) to reflux temperature for two hours. A flow of nitrogen and agitation were continued throughout the course of the reaction. The resultant mixture was filtered while hot. A solid precipitated as the filtrate cooled to ambient temperature. The solid material was isolated, washed with 100–200 cc. of diethyl ether and dried to yield 82.1 g. of a solid melting between 95°–97° C. This solid was washed twice with cold ether, recrystallized from benzene and finally washed with pentane to yield 51.8 g. of a tan solid melting between 99° and 102° C. An additional 63.5 g. of a white solid melting between 99° and 102° C. was obtained following recrystallization from benzene of the gray solid present in the initial reaction mixture. This recrystallized material was washed with pentane and dried prior to being weighed. Upon analysis, the combined solids were found to contain 42.64% tin and 25.43% chlorine. The calculated concentrations of tin and chlorine in bis (methoxymethyl)tin dichlordie are 42.43% and 25.35%, respectively.

Bis(methoxymethyl)tin oxide was prepared by reacting bis(methoxymethyl)tin dichloride (14.0 g.) dissolved in 50 cc. of methanol with a solution containing 4.0 g. of sodium hydroxide and 75 cc. of methanol containing a few drops of water. The solution of sodium hydroxide was added over a 15 minute period during which the temperature of the reaction mixture was maintained below 10° C. A white solid began to precipitate when the addition of sodium hydroxide was about half completed. Following completion of the addition the resultant mixture was allowed to remain at ambient temperature for one-half hour, after which the white solid in the reaction vessel was recovered, washed with cold (0° C.) methanol and dried under reduced pressure to yield 3.7 g. of material that did not melt below 300° C. The liquid phase of the initial reaction mixture was evaporated to dryness under reduced pressure, and the resultant solid washed with cold (0° C.) methanol and dried to yield 6.9 g. of a white solid that did not melt below 300° C. The solid was washed with deionized water to remove soluble chlorides, then dried under reduced pressure. Upon analysis the combined products were found to contain 51.61% by weight of tin. The calculated tin content for bis(methoxymethyl)tin oxide is 52.80%.

Bis(methoxymethyl)tin diacetate was prepared by reacting bis(methoxymethyl)tin dichlordie (7.0 g.) with 10.8 g. of silver acetate using 100 cc. of chloroform as a diluent. The resultant mixture was heated to the boiling point (63° C.) under a nitrogen atmosphere for one hour in a reaction vessel equipped with a stirrer and a reflux condenser. After it had cooled to ambient temperature, the mixture was filtered and the solid phase washed with 400 cc. of chloroform. The combined filtrates were evaporated to dryness to give a brown oil weighing 7.3 g. which solidified to a crystalline mass at room temperature. The product was found to contain 38.27% by weight of tin and 35.96% of acetate radical

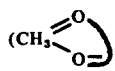

The calculated values of tin and acetate content for bis(methoxymethyl)tin diacetate are 36.31% and 36.12%, respectively.

The methyltin compounds evaluated as gel catalysts are either commerically available or were prepred from trimethyltin chloride or dimethyltin dichloride using known synthetic procedures.

EXAMPLE 2

This example demonstrates the use of the bis (methoxymethyl)tin compounds disclosed in Example 1 as gel catalysts for preparing flexible polyurethane foams. Each gel catalyst was added to the formulation as an aqueous solution containing 10% by weight of catalyst. The solution containing bis(methoxymethyl)tin dichloride showed no evidence of hydrolysis, as indicated by the absence of solid material, after remaining undisturbed for one week under ambient conditions.

The foams were prepared by combining 2.0 parts by weight of the aforementioned gel catalyst solution, 22.5 parts of a mixture containing 80% by weight of 2,4-tolylene diisocyanate and 20% by weight of 2,6-tolylene diisocyanate and 50.8 parts of a precursor or master batch containing 50 parts of a glycerine-based polyoxypropylene triol having a molecular weight of 3000, 0.5 part of a polysiloxane type of surfactant, 0.15 part of N-ethyl morpholine and 0.15 part of a 33% solution of triethylene diamine in dipropylene glycol. The gel catalysts evaluated were bis(methoxymethyl)tin dichloride, bis(methoxymethyl)tin oxide and bis(methoxymethyl)tin diacetate. The time interval between combining of the reagents and completion of foam formation, conventionally referred to as the rise time, was between 90 and about 200 seconds for each of the formulations tested. The size, density and color of the foams were similar to those of a foam prepared by replacing the aforementioned aqueous gel catalyst solution with 0.15 part dioctyl phthalate, 0.15 part stannous octoate and 1.75 parts of water. The water and stannous octoate were added as separate components to the formulation, since stannous octoate is known to decompose rapidly in the presence of even trace amounts of water.

All of the foams passed the Dry Heat Test as described in the American Society for Testing of Materials procedure D-1654-64-A, which is hereby incorporated by reference.

EXAMPLE 3

Flexible polyurethane foams were prepared as described in the preceeding Example 2. The precursor contained 100 parts of the same polyoxypropylene triol, 3.5 parts of water, 1.0 part of a polysiloxane surfactant, 0.3 part N-ethyl morpholine and 0.3 part of a 33% solution of triethylene diamine in dipropylene glycol. To 52.5 parts of this precursor was added 20 parts of the tolylene diisocyanate mixture described in Example 2 together with 0.15 g. of dimethyltin dichloride. The resultant mixture was stirred rapidly for 10 seconds to obtain a homogeneous system and was then allowed to rise. The rise time was 113 seconds. The resultant foam passed the Dry Heat Test referred to in Example 2.

EXAMPLE 4

Rigid foams were prepared using the following formulation:

| | Parts |
|---|---|
| Polyoxypropylene tetrol (sucrose based, hydroxyl no. = 435) | 100.0 |
| Trichlorofluoroethane | 37.0 |
| Polysiloxane surfactant | 1.5 |
| Dimethylethanolamine | 1.0 |
| Water | 1.0 |
| Polymethylene polyphenylene isocyanate | 37.0 |

Each of the foregoing ingredients was separately added to a reaction vessel together with 1.0 part of dimethyltin dichloride as a solution in 1.0 part of water. the rise time was 62.9 seconds. A foam prepared from the same formulation using 1.0 part of dibutyltin dilaurate, a conventional gel catalyst for rigid polyurethane foams, required 71 seconds to rise.

EXAMPLE 5

This example compares the hydrolytic stability of flexible urethane foam precursors containing the present methyl and methoxymethyltin compounds with precursors containing prior art catalysts, including stannous 2-ethylhexoate and dibutyltin dichloride.

Each of the formulations evaluated contained 100.0 parts by weight of a glycerine-based polyoxypropylene triol exhibiting a molecular weight of 3000, 1.0 part of a polysiloxane type of surfactant, 0.3 part of N-ethyl morpholine, 0.3 part of a 33% by weight solution of triethylene diamine in dipropylene glycol, 3.5 parts of water and 0.4 part catalyst as specified in the accompanying table. Stannous 2-ethylhexoate was added as a solution in the polyol. Polyurethane foams were prepared by combining 45.0 parts of a mixture containing 80% by weight of 2,4-tolylene diisocyanate and 20% of the 2,6-isomer with 105.5 parts of each of the formulations, following which the formulation was stirred at high speed for a few seconds then poured into a container and allowed to rise. The cream and rise times were noted. A portion of each formulation was reacted with isocyanate shortly after being prepared. A second portion was allowed to stand for twelve days under ambient conditions before being reacted with the isocyanate to determine whether the water in the formulation adversely affected the catalyst, as evidenced by a significant increase in the cream and rise times. These values are recorded in the accompanying table.

TABLE

| Catalyst | Cream Time (seconds) | | Rise Time (seconds) | |
|---|---|---|---|---|
| | Initial | After 12 days | Initial | After 12 days |
| Stannous 2-ethylhexoate | 16 | 21 | 92 | 245* |
| $(CH_3OCH_2)_2SnCl_2$ | 28 | 31 | 204 | 212 |
| $(CH_3)_2SnCl_2$ | 31 | 35 | 161 | 168 |
| $[(CH_3OCH_2)_2Sn]_2O$ | 21 | 22 | 111 | 118 |
| $(n-C_4H_9)_2SnCl_2$ | Insoluble in either water or polyol, could not be evaluated. | | | |

*Foam did not rise to full height and collapsed five minutes after rise was completed.

The data in the table demonstrate that stannous loses activity when in contact with water. Dibutyltin dichloride could not be dissolved in the formulation, yet dimethyltin dichloride was soluble and proved to be a useful catalyst. The present class of methyl- and methoxymethyltin compounds are unique by virtues of their solubility in water and the fact that these compounds do not lose activity when stored for extended periods of time in contact with formulations containing water.

What is claimed is:

1. A hydrolytically stable precursor for preparing flexible or rigid cellular polyurethanes, said precursor consisting essentially of 100 parts by weight of a polyalkylene polyol, between 0.5 and 5 parts of water, between 0.05 and 0.5 parts of a foaming catalyst, between 0.05 and 2 parts of a silicone surfactant and between 0.05 and 0.5 parts of a gel catalyst, said gel catalyst being selected from the group consisting of organotin compounds of the formulae $R_aSnX_{4-a}$, $R_2SnO$ and $(R_3Sn)_2O$ wherein R is $CH_3-$ or $CH_3OCH_2-$, X is selected from the group consisting of the chlorine, bromine and iodine atoms and radicals of the formula $-OOCCH_3$ or $-OOCCH_2CH_3$ and $a$ is the integer 2 or 3.

2. A hydrolytically stable precursor as described in claim 1 wherein X is chlorine or $-OOCCH_3$.

3. A hydrolytically stable precursor as described in claim 2 wherein R is methyl.

* * * * *